United States Patent Office 3,565,785
Patented Feb. 23, 1971

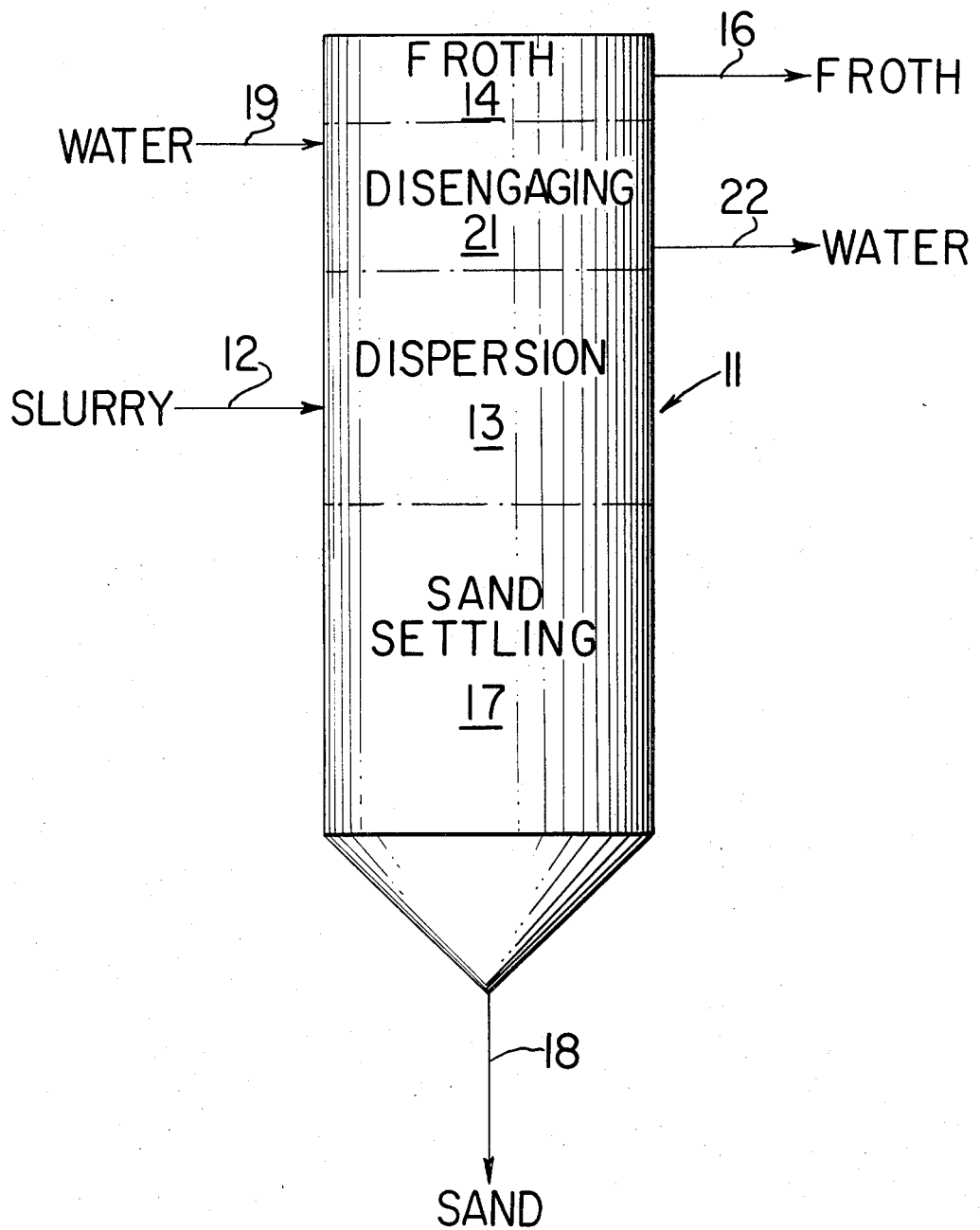

3,565,785
TEMPERATURE CONTROL IN RECOVERY OF BITUMEN FROM BITUMINOUS SAND
Lubomyr M. O. Cymbalisty, Edmonton, Alberta, Canada, assignor of thirty percent each to Cities Service Athabasca, Inc., a corporation of Delaware; Imperial Oil Limited, a corporation of Canada; and Atlantic Richfield Corporation, a corporation of Pennsylvania; and ten percent to Royalite Oil Company, Limited, a corporation of Canada
Filed June 17, 1968, Ser. No. 737,667
Int. Cl. C10q 1/04
U.S. Cl. 208—11
3 Claims

ABSTRACT OF THE DISCLOSURE

A process for the recovery of bitumen from tar sand in which a fluid slurry of tar sand is introduced into an intermediate zone of a body of hot water with bitumen rising to the top in the form of a layer of bituminous emulsion and said settling to the bottom. An upper zone of the body of water immediately below the layer of bituminous emulsion is heated to a temperature greater than the temperature of the intermediate zone into which the slurry is introduced. Such temperature increase is preferably at least about 10° F. It is preferred that the water into which the slury is introduced be maintained at less than about 160° F. and that the temperature of the heated water immediately below the emulsion layer be maintained between about 165° and about 200° F.

---

Large deposits of bituminous sand are found in various localities throughout the world. The term "bituminous said" is used herein to include those materials commonly referred to as oil sand, tar sand and the like. One of the most extensive deposits of bituminous sand occurs, for instance, in the Athabasca District of the Province of Alberta, Canada.

Typically, these sands contain from about 6% to about 20% of bitumen (also referred to herein as oil), from about 1% to about 10% of water, and from about 70% to about 90% of mineral solids. The specific gravity of the bitumen varies from about 1.0 to about 1.05 and the bitumen has an API gravity of about 8.0 degrees. This value for specific gravity as well as that of the specific gravity of any other material given herein is taken at 60° F. All percentage values are on a weight basis unless otherwise specified.

The major portion, by weight, of the mineral solids in bituminous sand is quartz sand having a particle size greater than about 45 microns and less than 2,000 microns. The term "mineral" is used herein to describe material of inorganic origin such as sand, clay and the like as distinguished from material of organic origin such as coke. For the most part, the remaining mineral solid material has a particle size of less than about 45 microns. This smaller-size mineral solid material is referred to as "fines." The fines contain clay and silt including some very small particles of sand. The fines content typically varies from about 10% to about 30% by weight of the total solid mineral content of bituminous sand. However, it is not uncommon for the ingredients of bituminous sand to vary from the above-mentioned concentrations.

Various methods are known for separating bitumen from bituminous sand. Some of these methods involve the use of water for preparing a slurry at a temperature above about 75° F. Most of the coarse sand and portions of the fines are separated from the slurry by various means, such as settling, to recover an emulsion, or froth, which contains some of the fines, and quantities of coarse sand. Such an emulsion or froth is referred to herein as a bituminous emulsion. One well-known method for preparing such emulsions is often referred to as the "hot-water process." In the hot-water process, the bituminous sand is slurried with steam and/or hot water and the pulp is then agitated with a stream of circulating hot water and carried to a separation cell containing a body of hot water maintained at an elevated temperature. In the separation cell, entrained air causes the bitumen to rise to the top of the cell in the form of an emulsion containing air, bitumen, water and mineral solids. The mineral solids are extremely difficult to separate from the bitumen and, unless the emulsion is further treated, it will generally contain at least 5% of mineral solids. This bituminous emulsion or froth can be subjected to water washing to effect a partial reduction in solids.

A bituminous emulsion, such as that obtained by the above-described procedures, often contains from about 10% to about 60% water, 5% to about 20% of mineral solids and from about 30% to about 85% bitumen. Usually, however, the bituminous emulsion or froth will contain, by weight, from about 25% to about 50% water, about 5% to about 12% mineral solids and about 35% to about 70% of bitumen.

Separation of water and minerals solids from the bituminous emulsion is necessary for most ultimate uses of the bitumen. A number of methods have been devised for breaking bituminous emulsions and recovering the bitumen. One such method involves the use of thermal dehydration followed by cycloning as described in U.S. Pat. No. 3,338,814 to R. A. Given et al.

One of the problems associated with conventional processes for recovery of bitumen from tar sands is that the bituminous emulsions formed by introduction of tar sand slurry into a body of water in a separation cell as described above tend to contain undesirably large quantities of fine solids. It has now been found that the entrainment of such fines in the bituminous emulsion can be substantially reduced by heating the water in the separation cell immediately below the layer of bituminous emulsion formed on the top of the water to a temperature above the temperature at which the body of water is maintained in the intermediate zone into which the tar sand slurry is introduced.

The accompanying drawing is a somewhat diagrammatic illustration of a suitable arrangement of apparatus for carrying out a preferred embodiment of the invention and in which equipment is shown in elevation.

By heating the water immediately below the emulsion layer in the separation cell, it is possible to substantially reduce the amount of fine solid entrapped in the froth layer. While the reasons for this are not completely clear, it is believed that the application of heat at this point softens the droplets of bitumen rising to the top of the cell, thereby enabling them to release solids and to form a more compact froth with less opportunity for entrapment of solids between droplets. It is preferred that the water immediately below the emulsion layer be heated sufficiently to increase its temperature by at least 10° F.

In practicing the present invention, best results are obtained if the temperature of the zone of water in the separation cell ino which the slurry of tar sand is introduced and dispersed is maintained below about 160° F. while the upper zone of water immediately below the layer of emulsion is heated to a temperature of at least about 165° F. Merely maintaining the temperature of the body of water in the separation cell at 170° F., or even 200° F. does not produce as satisfactory results. It is believed that while relatively high temperatures are desirable in the upper zone of water immediately beneath the layer of emulsion, the use of such temperatures throughout the entire separation cell subjects the bitumen to high temperatures for too long a period of time. As a result the bitumen may soften to the point where too much air escapes from bitumen droplets, thus impeding the flotation of the bitumen, reducing recovery of bitumen and increasing the solids content of recovered emulsion.

Heat may be added to water immediately below the emulsion layer in any suitable manner such as by the use of heating coils or other suitable heating apparatus. A preferable method for introducing heat at this point is in conjunction with the introduction of additional water as set forth in the copending application of Lubomyr M. O. Cymbalisty and George Ronald Gray entitled "Improved Recovery of Bitumen from Bituminous Sand" and filed concurrently herewith. In order to obtain the temperature control described herein, it is necessary only to introduce the additional water referred to in such copending application at a sufficiently high temperature to insure that the zone of water immediately below the layer of emulsion is maintained at a temperature in accordance with the present invention as described above. While any suitable apparatus may be used in carrying out the present invention, apparatus of the type shown and described in my copending application entitled "Separation Vessel" and filed concurrently herewith is especially suited for such use.

For a better understanding of the invention, reference may be had to the accompanying drawing which shows a separation vessel 11 in which a body of hot water is maintained. An aqueous slurry of bituminous sand is introduced through a conduit 12 into the separation vessel 11 and is dispersed within the body of water in the separation vessel in a dispersion zone 13. Air entrained in this slurry causes bitumen to rise to the top of the body of hot water and form a layer of bituminous emulsion or froth 14 which may be removed through a conduit 16 as the project of the process. This froth may, of course, be treated in accordance with known techniques for recovery of bitumen therefrom. Sand settles to the bottom of the vessel 11 in a sand settling zone 17 and may be removed as through a conduit 18.

Water is introduced into the upper portion of the vessel 11 immediately below the froth layer 14 through a conduit 19. Water introduced through the conduit 19 is introduced into the upper portion of a disengaging zone 21 maintained above the dispersion zone 13. In the disengaging zone 21, bitumen disengages from fine solids and enters the froth layer 14. To improve disengagement of bitumen from fine solids, water is preferably withdrawn from the lower portion of the disengaging zone 21 as through a conduit 22. This water may be discarded or recycled to an earlier portion of the bitumen recovery process and may if desired be treated for removal of solids or bitumen therefrom. Water is preferably withdrawn through the conduit 22 at a sufficient rate to establish a slow downward movement of water within the disengaging zone 21, preferably between about 0.5 and about 2.5 ft. per minute. Other movement of mixtures of water bitumen and solids within the disengaging zone is likewise preferably kept to less than about 2.5 ft. per minute in order to prevent unnecessary entrainment of the fine solids in the froth layer 14.

In accordance with the invention, the water introduced through the conduit 19 is hot enough to raise the temperature of the water in the upper portion of the disengaging zone 21, preferably by at least 10°F. As mentioned above, a preferred embodiment of the invention involves maintaining the temperature of water in the dispersion zone 13 not greater than about 160° F. while the temperature of water in the upper portion of the disengaging zone 21 is maintained at least about 165° F.

The following example will illustrate the application of the present invention in the recovery of bitumen from tar sand.

EXAMPLE

In this example, a separation vessel generally similar in operation to the separation vessel 11 described above was used to recover bituminous emulsion from an aqueous slurry of bituminous sand. For comparison purposes, several runs were made in which all other factors were equal except that the temperature of the water introduced through the conduit 19 was varied to vary the temperature of the water in the disengaging zone 21. In the runs reported below, the temperature of the disengaging zone 21 was maintained at 150° F. The tar sand slurry introduced through the conduit 12 for all of these runs contained about 8 wt. percent bitumen, 32 wt. percent water, and 60 wt. percent solids and was fed to the separation cell at the rate of 750 pounds of tar sand per hour. During these runs, water was introduced through the conduit 19 at the rate of 90 lbs. per hour and no water was withdrawn through the conduit 22.

Table I below shows the temperatures maintained in the dispersion and disengaging zones as well as the compositions of the emulsion recovered through the conduit 16 for each of the runs reported. The amount of solids in the emulsion is also reported on the basis of pounds of solids per hundred pounds of bitumen and the amount of water in the emulsion is reported in terms of pounds of water per hundred pounds of bitumen for an easier comparison of the relative quality of the froths in these respects.

TABLE I

| Run No. | Dispersion zone temp. (° F.) | Disengaging zone temp. (° F.) | Emulsion composition (wt. percent) | | | Lbs. of solids per 100 lbs. of bitumen | Lbs. of water per 100 lbs. of bitumen |
|---|---|---|---|---|---|---|---|
| | | | Bitumen | Water | Solids | | |
| 1 | 150 | 150 | 75.63 | 20.38 | 3.99 | 5.7 | 26.3 |
| 2 | 150 | 165 | 74.29 | 23.02 | 2.69 | 4.1 | 29.9 |
| 3 | 150 | 175 | 76.39 | 20.93 | 2.68 | 3.6 | 28.7 |

From the data presented in Table I above, it can be seen that maintaining the disengaging zone 21 at a greater temperature than the dispersion zone 13 in accordance with the invention resulted in a substantial reduction in the solids content of the recovered emulsion.

While the invention has been described above with respect to a preferred embodiment thereof, it will be understood by those skilled in the art that various changes and modifications may be made without departing from the spirit and scope of the invention and it is intended to cover all such changes and modifications in the appended claims.

I claim:

1. In a process for the recovery of bitumen from bituminous sand in which a fluid slurry of bituminous sand is introduced into an intermediate zone of a body of water and in which bitumen is floated to the top of such body of water to form a layer of bituminous emulsion thereon for recovery therefrom while sand is allowed to settle to the bottom of such body of water for removal therefrom, the improvement which comprises heating an upper zone of the body of water immediately below and in contact with said layer of bituminous emulsion to a temperature greater than the temperature of said intermediate zone of such body of water.

2. The process of claim 1 in which said upper zone of the body of water is heated to a temperature at least 10° F. greater than the temperature of said intermediate zone of the body of water.

3. The process of claim 2 in which the temperature of said intermediate zone of the body of water is maintained less than about 160° F. and the temperature of said upper zone of the body of water is maintaiend between about 165° and about 200° F.

References Cited

FOREIGN PATENTS 680,576    2/1964    Canada _____ 208—11

CURTIS R. DAVIS, Primary Examiner

U.S. Cl. X.R.

209—166